(12) United States Patent
Vedula et al.

(10) Patent No.: US 8,286,000 B2
(45) Date of Patent: Oct. 9, 2012

(54) TECHNIQUES FOR DYNAMIC GENERATION AND MANAGEMENT OF PASSWORD DICTIONARIES

(75) Inventors: Srinivas Vedula, Orem, UT (US); Cameron Craig Morris, Saratoga Springs, UT (US)

(73) Assignee: Novell, Inc., Provo, UT (US)

( * ) Notice: Subject to any disclaimer, the term of this patent is extended or adjusted under 35 U.S.C. 154(b) by 1035 days.

(21) Appl. No.: 11/952,383

(22) Filed: Dec. 7, 2007

(65) Prior Publication Data
US 2009/0150971 A1 Jun. 11, 2009

(51) Int. Cl.
*H04L 29/06* (2006.01)
(52) U.S. Cl. .............. 713/183; 726/6; 726/18
(58) Field of Classification Search .......... 713/182, 713/183; 726/5, 6, 18; 704/10
See application file for complete search history.

(56) References Cited

U.S. PATENT DOCUMENTS

| | | | |
|---|---|---|---|
| 5,204,966 A * | 4/1993 | Wittenberg et al. | 726/6 |
| 5,394,471 A * | 2/1995 | Ganesan et al. | 713/183 |
| 5,481,672 A | 1/1996 | Okuno et al. | |
| 6,145,086 A * | 11/2000 | Bellemore et al. | 726/18 |
| 6,889,168 B2 * | 5/2005 | Hartley et al. | 702/186 |
| 6,971,014 B1 * | 11/2005 | Hagmeier et al. | 713/182 |
| 7,062,655 B2 * | 6/2006 | Nelson et al. | 713/183 |
| 7,200,754 B2 * | 4/2007 | Walters | 713/182 |
| 7,299,359 B2 * | 11/2007 | Hurley | 713/182 |
| 7,367,053 B2 * | 4/2008 | Sanai et al. | 726/6 |
| 7,467,403 B2 * | 12/2008 | Harris | 726/6 |
| 7,523,499 B2 * | 4/2009 | Wilkins et al. | 726/23 |
| 7,581,245 B2 * | 8/2009 | Rojewski | 726/6 |
| 7,685,431 B1 * | 3/2010 | Mullany | 713/184 |
| 7,882,555 B2 * | 2/2011 | Ben-Itzhak | 726/13 |
| 7,934,101 B2 * | 4/2011 | Stieglitz et al. | 713/183 |
| 8,108,685 B2 * | 1/2012 | Hurley | 713/182 |
| 2003/0005338 A1 | 1/2003 | Solioz | |
| 2003/0140258 A1 * | 7/2003 | Nelson et al. | 713/202 |
| 2004/0172564 A1 | 9/2004 | Federova et al. | |
| 2004/0177272 A1 * | 9/2004 | Walters | 713/201 |
| 2005/0171737 A1 * | 8/2005 | Hartley et al. | 702/186 |
| 2005/0235341 A1 * | 10/2005 | Stieglitz et al. | 726/5 |
| 2006/0048215 A1 | 3/2006 | Brown et al. | |
| 2006/0218524 A1 | 9/2006 | Solioz | |
| 2007/0006301 A1 * | 1/2007 | Nickell et al. | 726/22 |
| 2007/0143626 A1 * | 6/2007 | Okuda | 713/183 |
| 2007/0150934 A1 * | 6/2007 | Fiszman et al. | 726/1 |
| 2008/0060078 A1 * | 3/2008 | Lord | 726/26 |
| 2008/0114986 A1 * | 5/2008 | Morris et al. | 713/183 |
| 2008/0133933 A1 * | 6/2008 | Bender | 713/186 |
| 2008/0216170 A1 * | 9/2008 | Sanai et al. | 726/18 |
| 2008/0307235 A1 * | 12/2008 | Keohane et al. | 713/183 |

FOREIGN PATENT DOCUMENTS
WO WO 2005050417 A1 * 6/2005

OTHER PUBLICATIONS

Yang, Yanjiang; Deng, Robert H.; Bao, Feng; "A Practical Password-Based Two-Server Authentication and Key Exchange System", IEEE Transactions on Dependable and Secure Computing, vol. 3, No. 2, Apr.-Jun. 2006, pp. 105-114.*

(Continued)

*Primary Examiner* — Carl Colin
*Assistant Examiner* — Victor Lesniewski
(74) *Attorney, Agent, or Firm* — Schwegman, Lundberg & Woessner, P.A.

(57) ABSTRACT

Techniques for dynamic generation and management of password dictionaries are presented. Passwords are parsed for recognizable terms. The terms are housed in dictionaries or databases. Statistics associated with the terms are maintained and managed. The statistics are used to provide strength values to the passwords and determine when passwords are acceptable and unacceptable.

24 Claims, 3 Drawing Sheets

OTHER PUBLICATIONS

Ciaramella, Angelo; D'Arco, Paolo; De Santis, Alfredo; Galdi, Clemente; Tagliaferri, Roberto; "Neural Network Techniques for Proactive Password Checking", IEEE Transactions on Dependable and Secure Computing, vol. 3, No. 4, Oct.-Dec. 2006, pp. 327-339.*

Yampolskiy, Roman V.; "Analyzing User Password Selection Behavior for Reduction of Password Space", Proceedings of the 2006 40$^{th}$ Annual IEEE International Carnahan Conferences Security Technology, Oct. 2006, pp. 109-115.*

* cited by examiner

TECHNIQUES FOR DYNAMIC GENERATION AND MANAGEMENT OF PASSWORD DICTIONARIES

BACKGROUND

Often times an enterprise implements password administration for its online resources via the use of a dictionary. That is, the dictionary is used to detect when a user is trying to create a password having a common word in it that may be perceived as being more susceptible to being compromised by an intruder.

These dictionaries are generally not domain specific. For example, employees at a gardening store are more likely to use words such as "wisteria," "deciduous," and/or "perennial" than employees that work in a shipping yard.

Thus, a hacker, who is trying to attack a password-based system and who understands the enterprise that he/she is attacking, stands a much better chance of success by using domain-specific terminology in the attempts to generate passwords for access.

It may also be the case that a close knit set of employees all share a common interest with one another or common extra-curricular activities. Such that, if one employee became hostile and lost his/her job, then that particular employee would likely understand the terminology the employees used with one another and would likely stand a decent chance of cracking a password for one of the employees that remain with the enterprise. This is so, because users have a tendency to make passwords words or phrases that are some how meaningful to them and their lives. This makes it easier for a user to remember his/her password but also creates a security loop hole that savvy hackers can take advantage of.

Thus, what is needed is a mechanism, which permits dynamic generation and management of password dictionaries.

SUMMARY

In various embodiments, techniques for dynamic generation and management of password dictionaries are provided. More specifically, and in an embodiment, a method is presented for dynamically managing and using a password dictionary. A password is received from a user; the password is being proposed by the user as a new password for the user to use in order to access a secure resource or set of resources. The password is parsed to acquire one or more terms included in the password. Then, a password database is queried with the one or more terms and the password is denied when the one or more terms are located within the password database and when a frequency of use for those one or more terms, within the password database, exceeds a threshold value.

DETAILED DESCRIPTION

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
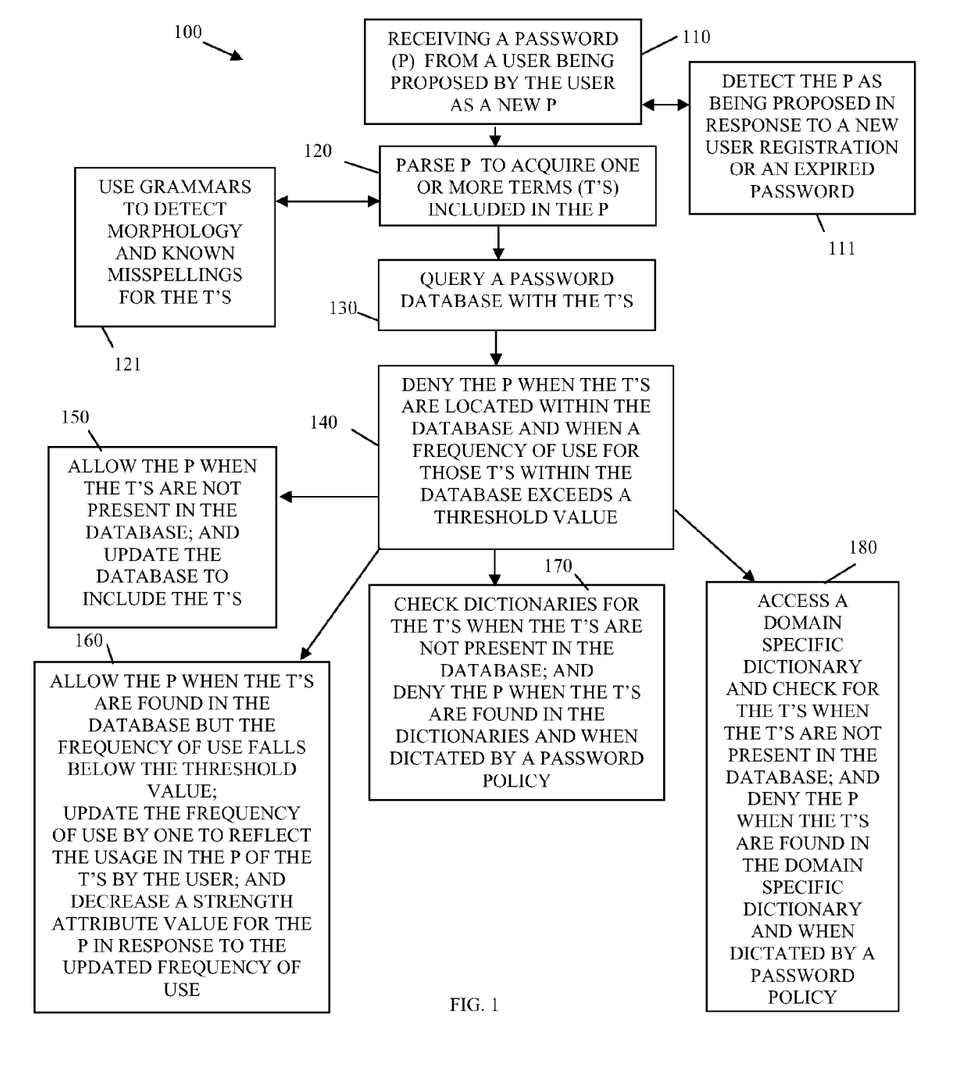
FIG. 1 is a diagram of a method for dynamically managing and using a password dictionary, according to an example embodiment.

FIG. 1 is a diagram of a method 100 for dynamically managing and using a password dictionary, according to an example embodiment. The method 100 (hereinafter "password dictionary management service") is implemented as instructions in a machine-accessible and readable medium. The instructions when executed by a machine perform the processing depicted in FIG. 1. The password dictionary management service is also operational over and processes within a network. The network may be wired, wireless, or a combination of wired and wireless.

Initially, the password dictionary management service interacts with a password service for an enterprise's secure network. Users access the secure network by authenticating; once authenticated the password service supplies unique identities to the users. Each unique identity includes its own assigned roles and security access rights. The password dictionary management service interacts with the password service to evaluate new passwords received from the users and to maintain and utilize one or more dictionaries or databases in response to the evaluation (discussed more completely herein and below).

As used herein the term "dictionary" may be used interchangeably with "database" or "data store." The dictionary holds terms. The terms may be common words, domain specific words, acronyms, abbreviations, colloquialisms, proper names, common misspellings of any of the aforementioned items, etc. Other information may be housed with the terms as well, such as but not limited to frequency counters, identifiers for specific users having such terms in their passwords, identifiers for specific groups having such terms in their passwords, active frequency counts reflecting active passwords that include the terms, inactive frequency counts reflecting usage by prior passwords but no longer actively being used, etc.

It is within this context that the processing associated with the password dictionary management service is now discussed with reference to the FIG. 1.

At 110, the password dictionary management service receives a password from a user. The password is being proposed by the user for use within the secure enterprise environment.

According to an embodiment, at 111, the password dictionary management service detects that the password is being proposed in response to a new user that is registering for access to the secure enterprise environment. In another situation, the password dictionary management service recognizes that the password is being proposed in response to an expired password associated with the user that needs to be replaced before it is terminated; or alternatively it may already be terminated when the user proposes the password.

At 120, the password dictionary management service parses the password to acquire one or more terms, which are included in the password. The parsing can be achieved in a variety of manners.

For example, at 121, the password dictionary management service can use predefined grammars to detect morphological roots or substrings contained with the password. This process is referred to as word or term stemming; where a term/word is reduced to its morphological root to account for subsequent variations to endings of the word (e.g., "ed," "ing," "s," etc.). By stemming the terms and processing the stemmed version of the terms, processing is substantially simplified because the universe of available terms is reduced. In some cases, stemming may also assist in correcting user misspellings, where those misspellings occur to the endings of the terms entered by the user. Additionally, the password dictionary management service can use tables and grammars to detect and resolve misspellings of terms. In this manner, even when a user misspells a word that misspelled word may be associated with its proper spelling and processed by the password dictionary management service as if it were properly spelled. In addition, the password dictionary management service may retain these misspellings in tables or as attributes associated with an entry in the password dictionary, where the master entry includes the proper spelling and the attributes show common misspellings that users have used over time with the proper spelling.

So, a variety of techniques can be employed to simply and account for user error when recognizing the terms within the password. This can include but is not limited to term stemming and misspelling recognition and management. Other data sources can be used as lookup mechanisms as well to ensure terms are being captured. So, a particular group within an enterprise, such as development, may have there own lexicon and a dictionary associated with that lexicon can be used as a lookup mechanism to detect whether such terms are present in the password.

At 130, the password dictionary management service queries an existing password database/dictionary with the terms that are parsed from the password. Again, in some instances the terms may be in stemmed form or may be in proper spelling form even when present in the password as a misspelling. In some cases, the database may also use a database query language to perform the query such as structured query language (SQL). In other cases, the database may be searched using basic table lookups or operating system search capabilities. Searching may also be optimized using a binary tree search algorithm. In fact, the password database can be in a variety of formats and a variety of searching mechanisms can be used to perform the query.

At 140, the password dictionary management service denies the password being proposed by the user when the terms are located within the database and when a frequency of use for those terms within the database exceeds a predefined threshold value. So, a policy may dictate that the password is to be denied when certain terms are found and when those terms exceed a usage threshold within the secure network environment.

According to an embodiment, 150, the password dictionary management service allows the password when the terms are not present in the database (search returned no results). In such a case, the password dictionary management service also updates the database to include the terms, which were not already present in the database. This ensures that any subsequent usage of the terms are detected and ensures that the password database/dictionary is dynamically being updated and maintained in view of terms being introduced by users of the secure network environment.

In another situation, at 160, the password dictionary management service allows the password when the terms are found in the database but the frequency of use attribute value falls below the threshold value. Here, the frequency of use is incremented by one and updated in the password database to reflect the usage of the terms by the user. This situation may also entail that a strength attribute value (representing the perceived security strength for the password) is to be decreased by the password dictionary management service. So, when the frequency attribute value changes, the provided password and any existing passwords having the term with an increased frequency attribute value, the strength attribute for the password can be correspondingly decreased slightly. This permits for dynamic modification and adjustment as conditions change within the secure network environment.

In yet another case, at 170, the password dictionary management service checks one or more dictionaries for the terms when the terms are not present in the password database. So, the password database/dictionary may not include the terms included within the password offered by the user. However, other dictionaries may include those terms and may be referenced to determine if the terms exist in those dictionaries. If the terms are present and if password policy dictates, then the password dictionary management service denies usage of the password being offered by the user. For example, a password may appear as follows "collegefootballfan." This includes three terms "college," "football," and "fan;" none of which appear in the password database but each of which appear in a Standard English dictionary. Policy may instruct the password dictionary management service to deny the password in this situation even when the terms are not in the password dictionary.

In still another situation, at 180, the password dictionary management service accesses a domain specific dictionary and checks for the terms when those terms are not found in the password database. The domain specific dictionary includes terms that are common within a particular industry or profession. For example, for a developer the term "applet" is unique and common to refer to a type of software program. Applet may have an entirely different meaning in another profession or may not be used at all. The password dictionary management service can again use policy to decide whether to accept or deny the password when the password includes terms that are located within a domain specific dictionary but are not present in the password database/dictionary. The domain specific dictionary can be resolved based on an attribute associated with the user that identifies the industry or profession to which the user is associated.

One now appreciates how a usage of passwords can drive the creation and maintenance of password database(s)/dictionaries. The database includes terms used in the passwords and frequency of use information. The frequency of use information when combined with policy provides for a stronger mechanism to assure security by ensuring that users are not using terms that a hacker may discover when constructing their passwords.

Figure 2:
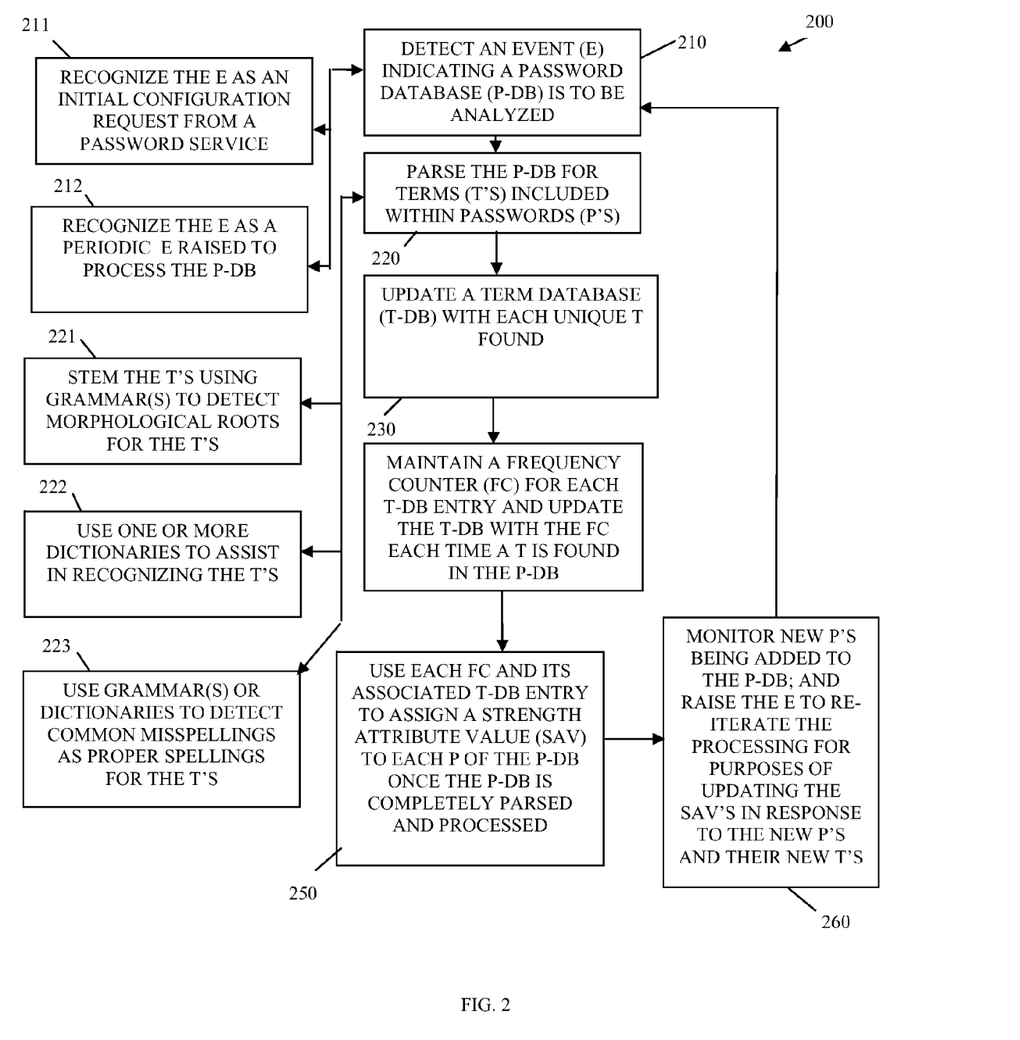
FIG. 2 is a diagram of a method for generating and maintaining a password dictionary, according to an example embodiment.

FIG. 2 is a diagram of a method 200 for generating and maintaining a password dictionary, according to an example embodiment. The method 200 (hereinafter "password dictionary generation service" is implemented in a machine-accessible and readable medium as instructions. The instructions when executed by a machine perform the processing depicted in the FIG. 2. Moreover, the password dictionary generation service is operational over a network, and the network may be wired, wireless, or a combination of wired and wireless.

The processing associated with the password dictionary generation service represents an enhanced and in some cases more detailed perspective of the password service represented by the method 100 and described within the context of the FIG. 1.

At 210, the password dictionary generation service detects an event. The event detection indicates that a password database (may also be referred to herein as password dictionary) is to be analyzed. In other words, the password dictionary generation service processes the password database in a batch or retroactive mode of operation after the password dictionary has acquired a variety of entries for passwords of users.

According to an embodiment, at 211, the password dictionary generation service recognizes the event as an initial configuration request from a password service. That is, the password service asks the password dictionary generation service to take a look at and configure the password database by performing the analysis discussed herein and below.

In another situation, at 212, the password dictionary generation service recognizes the event as a periodic event raised to process against the password database. In other words, at configurable intervals the password dictionary generation service processes against the password database to perform the analysis discussed below.

At 220, the password dictionary generation service parses the password database for terms. The passwords of users are included in the password database and the password dictionary generation service parses each password of the password database to detect terms located as substrings within the passwords. This can be achieved in a variety of manners.

For example, at 221, the password dictionary generation service stems the terms using one or more grammars to detect morphological roots for the terms within the passwords. This was described above with reference to the method 100 of the FIG. 1.

In another situation, at 222, the password dictionary generation service uses one or more other dictionaries to assist in recognizing the terms. So, table lookups with know dictionaries can be used to recognize the terms within the password.

In yet another case, at 223, the password dictionary generation service uses one or more grammars or dictionaries/tables/databases to assist in recognizing the terms contained within the passwords. Known terms and known misspellings from the grammars and/or dictionaries may be searched for within the passwords to resolve the terms. Again, the misspellings may map to proper spellings for purposes of analysis and all terms may be reduced to their morphological roots for purposes of analysis.

At 230, the password dictionary generation updates a term database with each unique term found by parsing the passwords.

At 240, the password dictionary generation service maintains a frequency counter for each term database entry. Each term database entry includes a uniquely used term (can be in morphological root format and proper spelling format). The frequency counter for each unique term of each entry is updated each time the password dictionary generation service locates another occurrence of a particular term within the password database.

At 250, the password dictionary generation service uses each frequency counter and its associated term-database entry (associated with a uniquely used term) to assign a strength value for each password of the password database. This is done as a second pass on the password database and once the term database is completely generated or formed and the password database completely processed at least once. So, password security strength values can all be adjusted and set after the password dictionary generation service processes the password database and forms the term database (newly generated password dictionary of terms).

According to an embodiment, at 260, the password dictionary generation service monitors the new passwords that are subsequently added to the password database and raises a new event for purposes of reiterating the processing discussed above with respect to 210-250 and updates the strength attribute values for the passwords when appropriate to do so (in other words when a particular term has a frequency counter updated with a newly added password having that term).

In this manner, the password dictionary generation service can be used dynamically after it is processed retroactively to keep the term database up-to-date and to keep password strength attribute values housed in the password database up-to-date. As conditions change so will the strength attribute values of the passwords and policy can be enforced, such that should a password that previously had an acceptable strength value be reassigned an unacceptable value, action can be taken by requesting that the user change the password to a more acceptable strength value.

Figure 3:
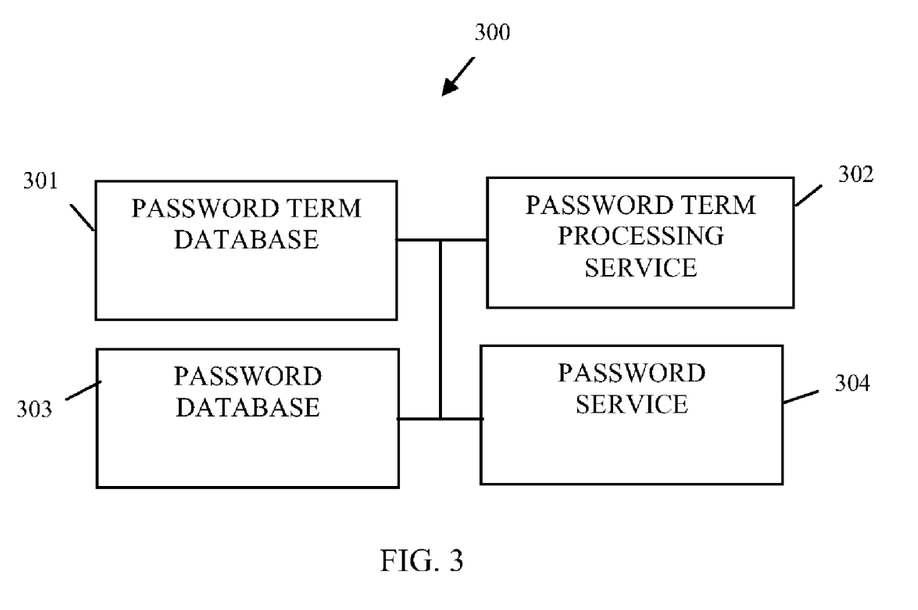
FIG. 3 is a diagram of a password dictionary system, according to an example embodiment.

FIG. 3 is a diagram of a password dictionary system 300, according to an example embodiment. The password dictionary system 300 is implemented as instructions on or within a machine-accessible and readable medium. The instructions when executed by a machine perform processing depicted with respect to the method 100 of the FIG. 1 and the method 200 of the FIG. 2. The password dictionary system 300 is also operational over a network and the network may be wired, wireless, or a combination of wired and wireless. In some cases the network is the Internet or a wide-area network (WAN).

The password dictionary system 300 includes a password term database 301 and a password term processing service 302. In an embodiment, the password dictionary system 300 may also include a password database 303 and/or a password service 304. Each of these will now be discussed in turn.

The password term database 301 is implemented in a machine-accessible and computer-readable medium and is accessible to the password term processing service that processes on a machine (computer, processing device, etc.).

Each entry in the password term database 301 includes a single unique term along with a frequency counter. The frequency counter identifies the number of times that term appears as a substring within passwords of users of a secure network enterprise. A single password may include multiple terms and multiple passwords may include a same term. But, each entry within the password term database 301 includes a single unique term. The iterations for which that term appears in passwords throughout the enterprise are accounted for in the frequency counter that is carried with the unique term in its entry within the password term database 301.

The frequency counter is also used to assign a strength attribute value to each password of a user. The actual passwords of the users may never be stored at all and may be hashed and evaluated when presented by a user. Alternatively, the passwords are housed in a password database 303, as was discussed above with reference to the method 200 of the FIG. 2.

Policy defines a minimum acceptable strength value for accepting or denying passwords.

The password term processing service 302 is implemented in a machine-accessible and computer-readable medium and is to process on the machine. Example processing associated with the password term processing service 302 was described in detail above with reference to the methods 100 and 200 of the FIGS. 1 and 2, respectively.

The password term processing service 302 evaluates passwords received. The passwords may be dynamically evaluated when presented by a user and never in fact actually retained. Alternatively, the passwords may be retained, such as in a password database 303 (discussed below). The password term processing service 302 evaluates passwords to parse out and derive terms included within the passwords. So, the password term processing service 302 decomposes passwords into one or more terms.

The frequency of the terms throughout the enterprise is managed by the password term processing service 302 and updated in the password term database 301. The policy permits the password term processing service 302 to also assign and manage the strength attributes assigned to passwords.

The strength attribute value for a password decreases as the frequency value of terms included in that password increase throughout the enterprise. The policy sets a minimum strength value. The password term processing service 302 assigns and manages the strength attribute values, the frequency counter updates, and policy enforcement.

According to an embodiment, the password term processing service 302 uses a grammar to detect each term in its morphological root format. The one or more terms detected within a password are stored within the password term database 301 in their root formats. It may also be that misspelled terms are corrected before housed in the password term database 301 (as was discussed in detail above with reference to the methods 100 and 200 of the FIGS. 1 and 2, respectively.

The password term processing service 302 can also use one or more dictionaries to assist in decomposing the passwords into one or more terms. The dictionaries may be domain specific. Each domain is identified in response to a profession or industry associated with a particular user and his/her password.

In an embodiment, the password dictionary system 300 also includes a password database 303 implemented in a machine-accessible and computer-readable medium and accessible to the password term processing service 302.

The password term processing service 302 periodically parses passwords housed within entries of the password database 303. This is done to acquire additional terms that are updated to the password term database 301.

According to an embodiment, the password dictionary system 300 also includes a password service 304. The password service 304 is implemented in a machine-accessible and computer-readable medium and is to process on the machine.

In an embodiment, the password service 304 uses the frequency counters to calculate the strength attribute values and make decisions based on the minimum strength value as to whether to accept or deny certain ones of the passwords. So, the password service 304 may actually manage and calculate the strength values and use the frequency counters maintained by the password term processing service 302 within the password term database 301.

Figure 4:
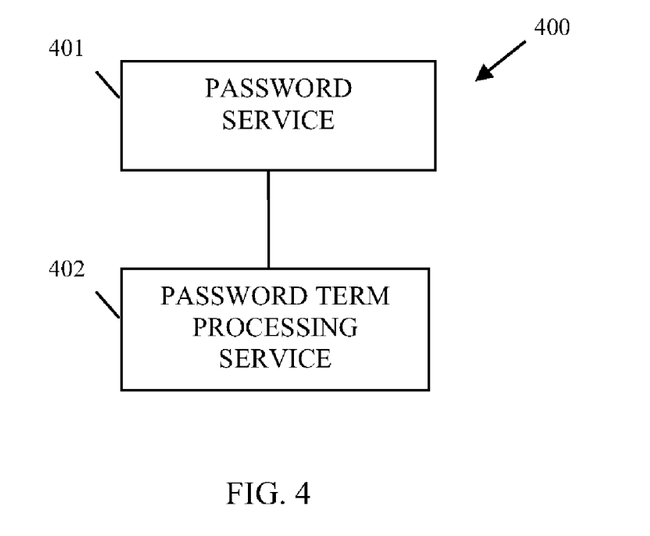
FIG. 4 is a diagram of another password dictionary system, according to an example embodiment.

FIG. 4 is a diagram of another password dictionary system 400, according to an example embodiment. The password dictionary system 400 is implemented as instructions on or within a machine-accessible and readable medium. The instructions when executed by one or more machines also perform, among other things; the processing depicted with respect to the method 100 of the FIG. 1 and the method 200 of the FIG. 2. The password dictionary system 400 is also operational over a network and the network may be wired, wireless, or a combination of wired and wireless.

The password dictionary system 400 includes a password service 401 and a password term processing service 402. Each of these will now be discussed in turn.

The password service 401 is implemented in machine-accessible and readable medium and is to process on a machine (computer, processing device, etc.).

The password service 401 uses statistics (discussed below) produced by the password term processing service 402 to provide each password of a secure network enterprise environment with a strength attribute value (representing the perceived security strength for any given password, the scale for acceptable and unacceptable values is configurable). The password service 401 enforces a policy as to a minimum acceptable strength value for each password before that password is permitted for use by a particular user of the enterprise environment.

The password term processing service 402 is implemented in a machine-accessible and computer-readable medium and is to process on the same machine as the password service 401 or an entirely different machine from that which is associated with the password service 401. Example processing associated with the password term processing service 402 was described in detail above with reference to the methods 100 and 200 of the FIGS. 1 and 2, respectively.

The password term processing service 402 detects terms housed or used in passwords throughout the enterprise environment and maintains statistics for a particular term's usage throughout the enterprise environment. Some statistics may include a frequency counter, a category (such as good term, bad term, offensive term, etc.), user identifications associated with the term, etc.

According to an embodiment, the password term processing service 402 uses one or more of the following to assist in detecting the terms from the passwords: a domain specific dictionary, a general language specific dictionary (such as the English dictionary), a grammar to stem the terms into morphological root formats, a dictionary to detect misspellings for the terms, etc.

In some cases, the password term processing service 402 can also periodically process against a password database to dynamically adjust and update the statistics being maintained. Also, the password term processing service 402 can automatically adjust the statistics each time a new password is received and/or added to the password database.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium and for execution on a machine, comprising:
   receiving, by the machine, a password from a user that is being proposed by the user as a new password for the user to use to access a secure resource or set of resources;

parsing, by the machine, the password to acquire terms included in the password;

querying, by the machine, a password database with the terms using a structured query language (SQL) to process the query;

denying, by the machine, the password when the terms are located within the password database and when a frequency of use for each term identified within the password database exceeds a threshold value; and housing in the password database with other information for that term including specific identifiers for each specific user that includes that term in that specific user's password, an active frequency count reflecting active passwords that include that term, an inactive frequency count reflecting prior passwords that used that term but are no longer actively being used, and group identifiers for specific groups that include that term in that specific group's password.

2. The method of claim 1 further comprising:
allowing, by the machine, the password when the terms are not present in the password database; and
updating, by the machine, the password database to include the terms.

3. The method of claim 1 further comprising:
checking, by the machine, one or more dictionaries for the terms when the terms are not present in the password database; and
denying, by the machine, the password when the terms are found in the one or more dictionaries and when dictated by a password policy.

4. The method of claim 1 further comprising:
accessing, by the machine, a domain specific dictionary and checking for the terms when the terms are not present in the password database, wherein the domain specific dictionary is identified in response to an attribute associated with the user that identifies an industry or a profession to which the user belongs to; and
denying, by the machine, the password when the terms are found in the domain specific dictionary and when dictated by a password policy.

5. The method of claim 1 further comprising:
allowing, by the machine, the password when the terms are found in the password database but the frequency of use falls below the threshold value;
updating, by the machine, the frequency of use by one to reflect the usage in the password of the terms by the user; and
decreasing, by the machine, a strength attribute value for the password in response to the updated frequency of use.

6. The method of claim 1, wherein receiving further includes detecting the password as being proposed by the user in response to a new user registration or in response to an existing password of the user becoming expired.

7. The method of claim 1, wherein parsing further includes using one or more grammars to detect morphology and known misspellings for the terms.

8. A method implemented in a non-transitory computer-readable storage medium and for execution on a machine, comprising:
detecting, by the machine, an event indicating that a password database is to be analyzed;
parsing, by the machine, the password database for recognizable terms included within passwords of the password database, each password identified as a separate password database entry in the password database, each password parsed for particular terms located as substrings within that password;
updating, by the machine, a term database with each unique recognizable term found, each term database entry in the term database includes a unique one of the recognizable terms;
maintaining, by the machine, a frequency counter for each term database entry and updating the term database with the frequency counter each time one of the recognizable terms is found in the password database, the frequency counter for each term reflects a total number of times that the term is used and each term database entry appearing once in the term database and stored in the term database in its morphological root format and in its proper spelling format, each frequency counter for each term including an active frequency counter and an inactive frequency counter, the active frequency counter providing a particular count for each term reflecting active passwords with that term and the inactive frequency counter providing a different count for each term reflecting prior passwords that used that term but are no longer active; and
using, by the machine, each frequency counter and its associated term database entry to assign a strength attribute value to each password of the password database once the password database has been completely parsed and processed, wherein the strength attribute when combined with a policy evaluation determines when certain ones of the passwords are to be rejected or accepted, and wherein users associated with rejected passwords are given an opportunity to change those rejected passwords.

9. The method of claim 8, wherein detecting further includes recognizing the event as an initial configuration request that is received from a password service.

10. The method of claim 8, wherein detecting further includes recognizing the event as a periodic event raised to process the password database, wherein the periodic event is raised at a configurable interval of time automatically.

11. The method of claim 8, wherein parsing further includes stemming the recognized terms using one or more grammars for purposes of detecting the morphological root for each term.

12. The method of claim 8, wherein parsing further includes using one or more dictionaries to assist in recognizing the terms.

13. The method of claim 8, wherein parsing further includes using one or more grammars or dictionaries to detect common misspellings for the terms and treating the misspellings as proper spellings for the terms.

14. The method of claim 8 further comprising:
monitoring, by the machine, new passwords being added to the password database; and
raising, by the machine, the event to re-iterate the processing for purposes of updating the strength attributes in response to the new passwords and their new terms.

15. A system, comprising:
a machine configured with a password term database residing in a non-transitory computer-readable medium and accessible to a password term processing service that executes on the machine;
the machine is also configured with the password term processing service implemented in a non-transitory computer-readable medium and to process on the machine;
wherein the password term processing service parses passwords for users and decomposes the passwords into terms, each term is stored a single time as an entry in the password term database and a frequency counter is maintained for each entry representing how many times the term associated with that entry was used within an enterprise secure network environment, each frequency counter including an active frequency counter for active passwords that use each term and an inactive frequency counter for prior passwords that used that term but are no longer active, and some passwords include multiple terms as substrings, each such term uniquely stored in the password term database once and some passwords share a particular same term with one another, and each term stored in a proper spelling format even when a particular password includes a misspelling for such term, and wherein the frequency counter is used to assign a strength attribute to each password and a policy dictates a minimum strength value for accepting or denying certain ones of the passwords.

16. The system of claim 15 further comprising, a password database implemented in a machine-accessible and computer-readable medium and accessible to the password term processing service, wherein the password term processing service periodically parses passwords housed in the password database to acquire additional terms that are updated to the password term database.

17. The system of claim 15 further compromising, a password service implemented in a machine-accessible and computer-readable medium to process on the machine, wherein the password service uses the frequency counters to calculate the strength attributes and make decisions based on the minimum strength value whether to accept or deny the certain ones of the passwords.

18. The system of claim 15, wherein the password term processing service uses one or more dictionaries to assist in decomposing the passwords into the terms.

19. The system of claim 18, wherein at least one of the dictionaries is a domain specific dictionary determined in response to an industry or profession associated with a particular user having a particular password.

20. The system of claim 15, wherein the password term processing service uses a grammar to detect each term in a morphological root format, and wherein terms are housed in the password term database in their root formats.

21. A system, comprising:
a machine configured with a password service implemented in a non-transitory computer-readable medium for processing on the machine; and
the machine or a different machine configured with a password term processing service implemented in a non-transitory computer-readable medium and for processing on the machine or the different machine;
wherein the password term processing service detects terms housed in passwords and maintains statistics for a particular term's usage throughout an enterprise environment with respect to the passwords, and wherein the password service uses the statistics to provide each password with a strength value, and the password service enforces a policy as to a minimum acceptable strength value for each password before that password is permitted for use by a particular user of the enterprise environment and the password term processing service maintains the statistics as for each password to include a frequency counter and a category, the category including whether each password is deemed an offensive term or not, each particular term including an active frequency counter for active passwords having that term and each particular term including an inactive frequency counter for prior passwords that used that term but are no longer active.

22. The system of claim 21, wherein the password term service uses one or more of the following: a domain specific dictionary, a general language specific dictionary, a grammar to stem the terms into morphological root formats, and a misspelling dictionary to recognize common misspellings for the terms.

23. The system of claim 22, wherein the password term service periodically processes against a password database to dynamically adjust and update the statistics.

24. The system of claim 23, wherein the password term service automatically adjusts the statistics each time a new password is received or added to the password database.

* * * * *